US 9,481,055 B2

(12) United States Patent
Greber

(10) Patent No.: US 9,481,055 B2
(45) Date of Patent: Nov. 1, 2016

(54) SPIRAL EXCHANGER AND METHOD FOR MANUFACTURING SUCH AN EXCHANGER

(71) Applicant: Faurecia Systemes D'Echappement, Nanterre (FR)

(72) Inventor: Frederic Greber, Ecot (FR)

(73) Assignee: Faurecia Systemes D'Echappement, Nanterre (FR)

( * ) Notice: Subject to any disclaimer, the term of this patent is extended or adjusted under 35 U.S.C. 154(b) by 209 days.

(21) Appl. No.: 13/676,425

(22) Filed: Nov. 14, 2012

(65) Prior Publication Data

US 2013/0118722 A1    May 16, 2013

(30) Foreign Application Priority Data

Nov. 15, 2011    (FR) ...................................... 11 60354

(51) Int. Cl.
| F28F 3/14 | (2006.01) |
| F28D 7/02 | (2006.01) |
| F28F 7/00 | (2006.01) |
| B23P 15/26 | (2006.01) |
| F28D 9/04 | (2006.01) |
| F28D 9/00 | (2006.01) |

(52) U.S. Cl.
CPC .................. *B23P 15/26* (2013.01); *F28D 9/04* (2013.01); *F28D 9/0006* (2013.01); *F28D 9/0043* (2013.01); *Y10T 29/49366* (2015.01)

(58) Field of Classification Search
CPC ......... F28D 9/04; F28D 9/0043; B23P 15/26
USPC .................. 165/170, 163, 164, DIG. 398, 46
See application file for complete search history.

(56) References Cited

U.S. PATENT DOCUMENTS

| 1,110,065 | A | * | 9/1914 | Linga | ........................ | F28F 7/02 |
| | | | | | | 126/102 |
| 1,826,344 | A | * | 10/1931 | Dalgliesh | ....................... | 165/170 |
| 3,229,763 | A | * | 1/1966 | Rosenblad | ..................... | 165/166 |

(Continued)

FOREIGN PATENT DOCUMENTS

| DE | 3031698 A | * | 3/1982 |
| DE | 3031698 A1 | | 3/1982 |

(Continued)

OTHER PUBLICATIONS

Translation of Patent Document FR 835161 A named TRANS-FR 835161 A.*
Translation of Patent Document DE 3031698 A named TRANS-DE 3031698 A.*

*Primary Examiner* — M. Alexandra Elve
*Assistant Examiner* — Paul Alvare
(74) *Attorney, Agent, or Firm* — Carlson, Gaskey & Olds, PC

(57) ABSTRACT

A spiral exchanger has a winding axis and includes an outer sheet and an inner sheet secured to one another in a fastening plane before winding, and delimiting a space for a fluid between them. The outer sheet and the inner sheet are wound on themselves and each sheet includes a plurality of flexible areas and a plurality of rigid areas. The flexible areas are more flexible than the rigid areas during folding. The flexible areas and the rigid areas are extended along the winding axis, and at least one flexible area of the outer sheet and at least one flexible area of the inner sheet that delimit the space between them form a pair of flexible areas that are aligned in the same radial direction.

23 Claims, 4 Drawing Sheets

(56) References Cited

U.S. PATENT DOCUMENTS

| | | | |
|---|---|---|---|
| 4,178,991 A * | 12/1979 | Bieri | 165/166 |
| 4,270,602 A * | 6/1981 | Foster | 165/167 |
| 4,274,186 A * | 6/1981 | Pringle | 29/890.039 |
| 4,562,630 A * | 1/1986 | Larsson | 29/890.039 |
| 6,585,034 B2 * | 7/2003 | Oswald | 165/10 |
| 2002/0005280 A1 * | 1/2002 | Wittig et al. | 165/166 |
| 2003/0102114 A1 * | 6/2003 | Gueguen | 165/164 |
| 2011/0016858 A1 | 1/2011 | Gaiser | |

FOREIGN PATENT DOCUMENTS

| | | |
|---|---|---|
| FR | 835161 A * | 12/1938 |
| FR | 2810726 | 12/2001 |
| FR | 2874080 | 2/2006 |
| GB | 960975 A * | 6/1964 |
| WO | 2005017435 A1 | 2/2005 |

* cited by examiner

SPIRAL EXCHANGER AND METHOD FOR MANUFACTURING SUCH AN EXCHANGER

CROSS-REFERENCE TO RELATED APPLICATIONS

This application claims priority to FR 11 60354, filed Nov. 15, 2011.

TECHNICAL FIELD

The invention relates to a spiral exchanger, and to a portion of an exhaust that includes such an exchanger. Furthermore, the invention relates to a method for manufacturing a spiral exchanger.

BACKGROUND OF THE INVENTION

Several types of spiral exchangers exist in the state of the art. Typically, such exchangers are formed by two superimposed sheets that are then wound and arranged in an exhaust duct of an internal combustion engine.

In one type of spiral exchanger, the sheets are spaced apart with spacers. For example, application FR 2 810 726 A1 discloses a spiral exchanger that is made by two sheets spaced apart that have, on their surfaces across from the inner spacing elements and the opposite surface, respectively, outer spacing elements that are arranged so that the inner and outer spacing elements of one sheet bear on the corresponding inner and outer spacing elements of the other sheet. The spacing elements have substantially the same shape. In application FR 2 809 483 A1, a metal strip having spacing elements is formed by folding the edges, which are then connected to one another by welding. The folded metal strip is then wound to form the spiral exchanger.

Application FR 2 874 080 A1 relates to an exchanger comprising two wound metal sheets. The metal sheets are provided with spacing elements in the form of serrations distributed on the surface thereof. Furthermore, the inlet and outlet for the fluid, for example water, of the device are done at a center of the spiral. This means that the inlet and outlet tubes will exit on either side of the exchanger and have a complicated trajectory, which is therefore costly. Typically, the water circulating in such an exchanger is at most at a temperature of 130° C., and therefore significantly below that of the exhaust gas that heats the water. The fact that there are differential expansions between these water tubes and exhaust tubes may cause wear of the materials after extended use.

Generally, when two metal sheets are wound on one another, the metal sheet on the outer side is always longer than the inner sheet for an equivalent number of winding turns due to its thickness and/or the space between the two metal sheets. If the two metal sheets are welded before winding, for example as in application FR 2 809 483 A1, deformations will appear on the inner sheet. As a result, in the prior art, the sheets are often welded during or after winding, for example such as in application FR 2 810 726 A1. Nevertheless, welding during winding poses manufacturing problems, in particular for thin sheets. In fact, thin sheets cannot be welded using an electric arc and it is not possible to consider seam welding due to problems of accessing the heel that returns current. Furthermore, laser welding is difficult. The welding problem becomes increasingly complicated if it is necessary to perform intermediate welds between two side welds.

The aim of the present invention is to overcome the drawbacks of the state of the art and in particular to use a spiral exchanger that is easy to manufacture, light, and inexpensive.

SUMMARY OF THE INVENTION

A spiral exchanger has a winding axis and comprises an outer sheet and an inner sheet secured to one another in a fastening plane before winding and delimiting a space for a fluid between them. The outer sheet and the inner sheet are wound on themselves and each comprises a plurality of flexible areas and a plurality of rigid areas. The flexible areas are more flexible than the rigid areas during folding. The flexible areas and the rigid areas are extended along the winding axis, and at least one flexible area of the outer sheet and at least one flexible area of the inner sheet that delimit the space between them form a pair of flexible areas that are aligned in a same radial direction.

The spiral exchanger includes one or more of the following exemplary features: the flexible areas of the outer sheet and/or the inner sheet are substantially rectilinear; the majority of the flexible areas, in particular all of the flexible areas, of the outer sheet form, with a respective flexible area of the inner sheet, a pair of flexible areas that are aligned in a same radial direction; considered in cross-section in the direction of winding, the rigid areas are formed by flats and the flexible areas are formed by hollow profiles and edges between the hollow profiles and the flats, the hollow profiles in particular being formed toward the winding axis; each flexible area, in particular each hollow profile, of the outer sheet has, over the entire width of the outer sheet in the direction of the winding axis, a rectilinear part that is located at the fastening plane, and in that each flexible area, in particular each edge, of the inner sheet, has, over its entire length parallel to the winding axis, at least one rectilinear portion that is located in the fastening plane to form a plurality of hinges in the fastening plane; a plurality of rigid areas, in particular a plurality of flats, of the outer sheet is provided with at least one hollow portion, each hollow portion bearing against a rigid area of the inner sheet; the exchanger comprises at least one fluid inlet opening to introduce fluid into the space and at least one fluid outlet opening to remove fluid from the space, the inlet opening(s) and outlet opening(s) being arranged at a first end of one of the outer sheet or the inner sheet in the winding direction, the first end being opposite a second end at which the winding began; the space is U-shaped, W-shaped, or zigzagged, having substantially rectilinear branches; the outer sheet and the inner sheet are fastened to one another respectively between two branches; the outer sheet and the inner sheet have a respective cut-out between two branches; an average passage diameter in the space decreases between the inlet opening(s) and the outlet opening(s); each branch has a substantially constant width and the width of the branches in the direction of the winding axis of the at least two adjacent branches decreases one relative to the other; and/or the outer sheet and/or the inner sheet is/are made up of a metal sheet.

Furthermore, in another embodiment, a portion of an exhaust includes such an exchanger.

Additionally, a method for manufacturing a spiral exchanger comprises the following steps: stamping, in an outer sheet and an inner sheet, a plurality of flexible areas and a plurality of rigid areas, the flexible areas being more flexible than the rigid areas during folding, and the flexible areas and the rigid areas being elongated along the winding axis; aligning the outer sheet and the inner sheet such that at least one flexible area of the outer sheet and at least one flexible area of the inner sheet form a pair of flexible areas that are aligned with one another; permanently fastening the outer sheet to the inner sheet at predetermined locations to form a space between them; and winding the outer sheet and the inner sheet to form the spiral exchanger.

The method includes one or more of the following exemplary features: considered in the direction of winding, the rigid areas are formed by flats and the flexible areas are formed by hollow profiles and edges between the hollow profiles and the flats, during the winding steps the hollows are oriented toward the winding axis; at least one of the outer or inner sheets comprises a fluid inlet opening for introducing fluid into the space and at least one fluid outlet opening for removing fluid from the space, the sheets having a first end in the winding direction in which the openings are arranged, the winding step starting with a second end opposite the first end; the space formed is U-shaped, W-shaped, or zigzagged, the space having substantially rectilinear branches, the method also comprising a step for cutting the outer and inner sheets between at least two adjacent branches to form a cut-out; and/or the method comprises steps for forming an exchanger according to the invention.

BRIEF DESCRIPTION OF THE DRAWINGS

Other features and advantages of the present invention will emerge from the description thereof provided below, in reference to the drawings, which illustrates several non-limiting embodiments and in which.

DETAILED DESCRIPTION

Figure 1:
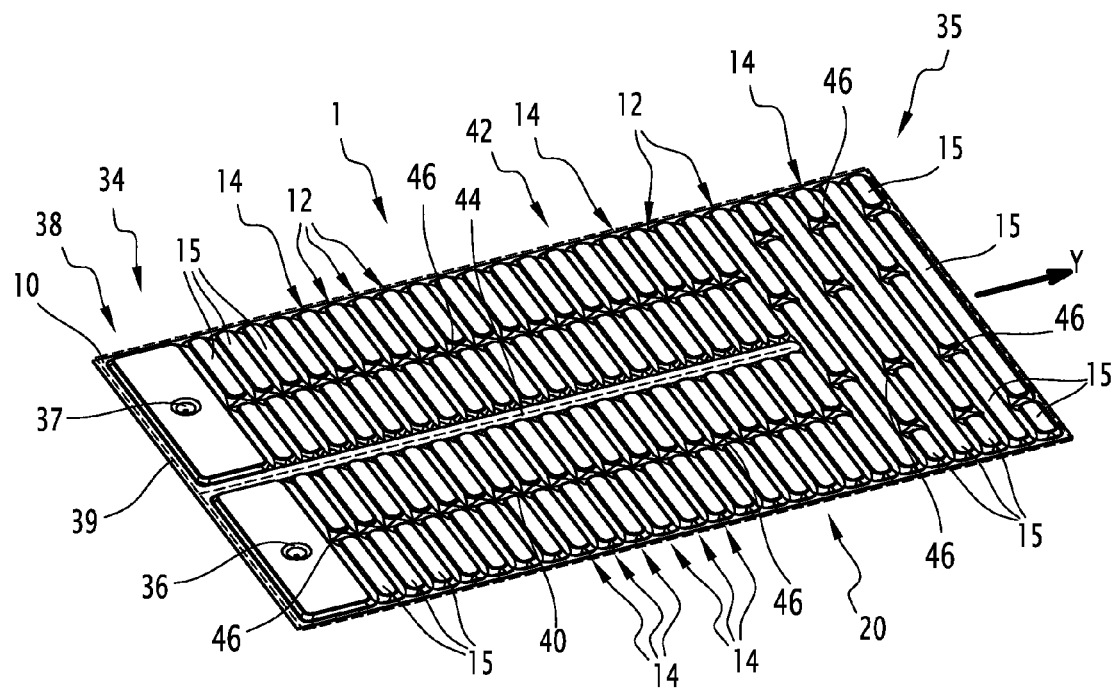
FIG. 1 is a perspective view of the two sheet metal sheets for a spiral exchanger according to the invention.
Figure 2:
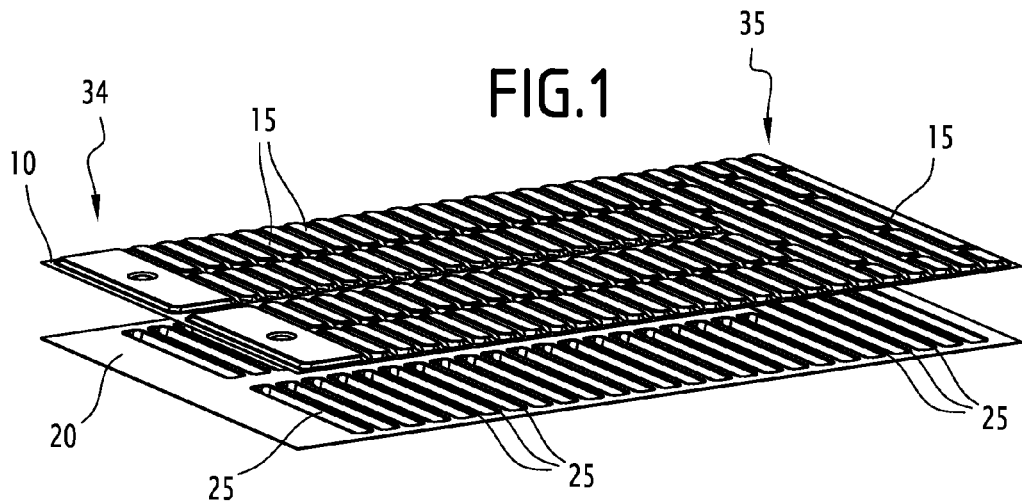
FIG. 2 is an exploded schematic view of two sheet metal sheets for a spiral exchanger according to the invention.
Figure 3:
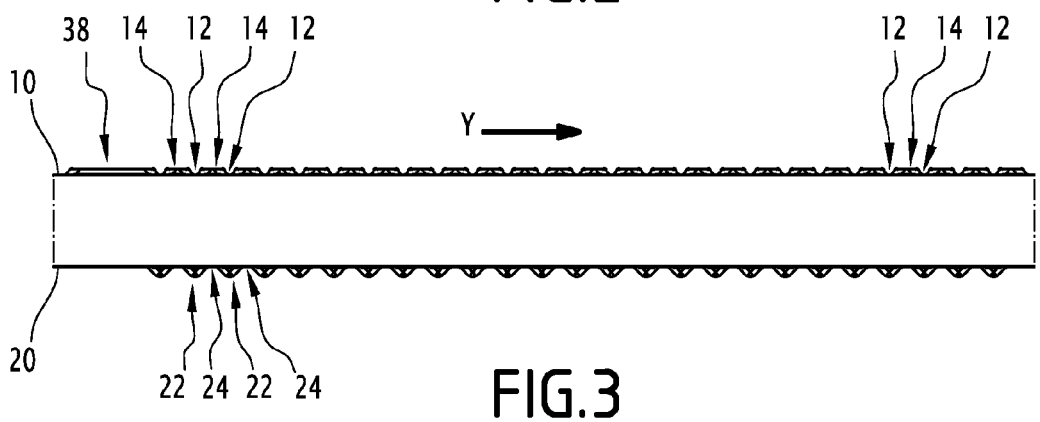
FIG. 3 is a side view of two sheet metal sheets for an exchanger according to the invention before connection of the two sheets.
Figure 4:
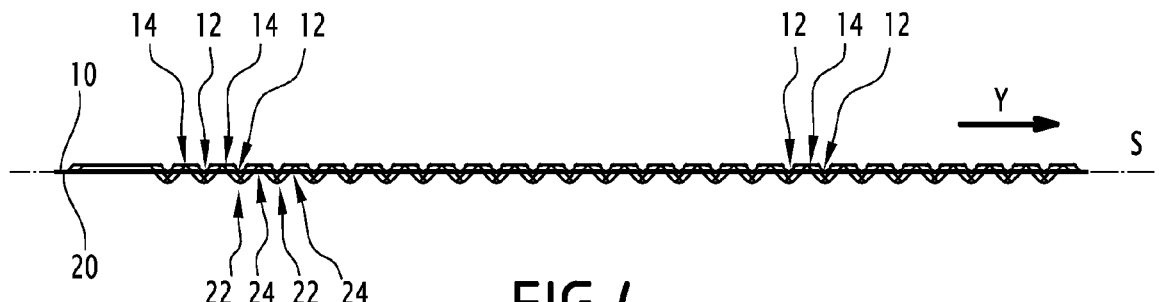
FIG. 4 is a side view of the two sheet metal sheets for an exchanger according to the invention after connection of the two sheets.

A first embodiment will be described using FIGS. 1 to 5. FIGS. 1 to 5 schematically show an elongated element of an exchanger 1 before winding to form a spiral exchanger. The element 1 comprises two sheet metal sheets 10, 20, in particular an outer sheet 10 and an inner sheet 20 that are fastened to one another. During winding of the element 1 around the winding axis X (see FIG. 6), the inner sheet 20 is radially inside relative to the outer sheet 10.

The element 1 has a winding direction Y in which the element 1 is wound. The winding direction Y is substantially orthogonal to the winding axis X. The length of the element 1 is defined in the winding direction Y and the width of the element 1 is defined in the direction of the winding axis X.

The inner sheet 20 has a thickness $d_i$ larger than a thickness $d_e$ of the outer sheet 10. Typically, the sheets have a thickness between 0.05 mm and 0.5 mm, in particular between 0.10 mm and 0.4 mm. The winding of these sheet metal sheets 10, 20 requires less effort than winding sheet metal sheets having a higher thickness, for example metal sheets having a thickness from 0.6 mm to 1 mm.

The outer sheet 10 and the inner sheet 20 have undergone a deformation step, for example stamping, and after that deformation each have a plurality of flexible areas 12, 22 and a plurality of rigid areas 14, 24. The rigid 14, 24 and flexible areas 12, 22 are elongated parallel to the winding axis X and orthogonally to the winding direction Y. The flexible 12, 22 and rigid 14, 24 areas are arranged alternately in the winding direction Y. The flexible 12, 22 and rigid 14, 24 areas extend over the entire width of the element 1.

Figure 5:
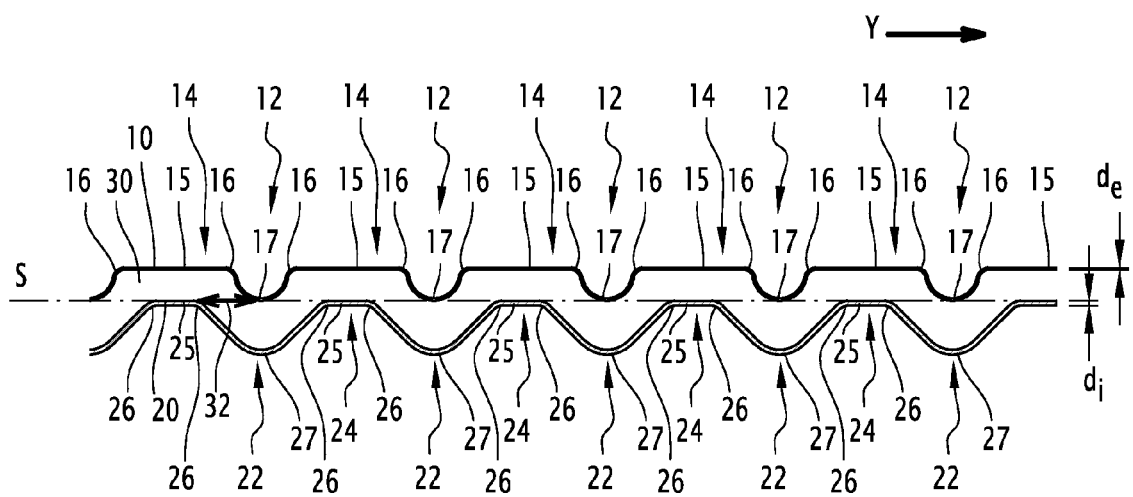
FIG. 5 is a longitudinal cross-sectional view of a portion of the two sheet metal sheets of an exchanger according to the invention after connection of the two sheets.

The shape and arrangement of the rigid 14, 24 and flexible areas 12, 22 are clearly shown in FIG. 5. During the deformation, a plurality of flats 15, 25, a plurality of edges 16, 26, and a plurality of hollow profiles 17, 27 are respectively formed in the outer sheet 10 and the inner sheet 20. The edges 16, 26 are arranged between the flats 15, 25 and the hollow profiles 17, 27. The flats 15, 25 form the rigid areas 14, 24 and the edges 16, 26, and the hollow profiles 17, 27 form the flexible areas 12, 22. The flexible areas 12 of the outer sheet 10 have, in the winding direction Y, a smaller width relative to the length of the flexible areas 22 of the inner sheet 20.

In the outer sheet 10, the hollow profile 17 has, in the winding direction Y, a smaller width relative to the width of the flats 15. For example, the flats 15 of the outer sheet 10 have a width that is substantially twice the width of the hollow profiles 17.

In the inner sheet 20, the hollow profiles 27 have, in the winding direction Y, a width larger than the width of the flats 25. For example, the hollow profiles 27 of the inner sheet 20 have a width that is substantially twice the width of the flats 25.

In the embodiment of FIGS. 1 to 5, the width of the flats 25 of the inner sheet 20 substantially corresponds to the width of the hollow profile 17 of the outer sheet 10, and the width of the flats 15 of the outer sheet 10 corresponds substantially to the width of the hollow profiles 27 of the inner sheet 20.

The outer sheet 10 and the inner sheet 20 are arranged one on the other before they are connected, such that the flexible areas 12, 22, in particular the hollow profiles 17, 27, are placed substantially across from one another.

The outer sheet 10 is fastened to the inner sheet 20 in a fastening plane S before winding of the element 1. For example, the outer sheet 10 is fastened to the inner sheet 20 by a weld. When the sheets 10, 20 are fastened to one another, a space 30 is formed between the outer sheet and the inner sheet 20 (see FIG. 5).

The space 30 is provided for circulation of a fluid, for example water. For a fluid circulating in the space 30, a minimum passage section 32 is defined by the space between the hollow profile 17 of the outer sheet 10 and the edges 26 of the inner sheet 20.

As shown in FIG. 5, each flexible area 12, and therefore each hollow profile 17, of the outer sheet 10 has, over its entire length along the winding axis X, a rectilinear portion that is located at the fastening plane S. Additionally, the edges 26 and the flats 25 of the inner sheet 20 are in the fastening plane S.

In the winding direction Y, the element 1 comprises a first end 34 and a second end 35. At the first end 34 of the element 1, two openings 36, 37 are provided in a connection area 38 of the outer sheet 10, including a first or inlet opening 36 to allow fluid to enter the space 30 and a second or outlet opening 37 to allow the fluid to leave the space 30. The connection area 38 extends along the direction of the winding axis X, and the openings 36, 37 are provided in a connection flat having a larger width than the flats 15. In another embodiment, the distance between the openings 36, 37 along the winding axis X is larger or smaller relative to the embodiments shown in FIG. 1.

The outer sheet 10 is welded to the inner sheet 20 along a weld line 39 (dotted line in FIG. 1), which is done such that the space 30 between the two elongated sheets 10, 20 is generally U-shaped, whereof the branches 40, 42 are oriented toward the first end 34, where the inlet and outlet openings 36, 37 are arranged. A longitudinal portion 44 of the weld line 39 is arranged between the branches 40, 42. Therefore, during use of the element 1, the fluid, after entering the space through the first opening 36, passes through the first branch 40 toward the second end 35 to go from the first branch 40 to the second branch 42 in which the fluid passes through the element 1 from the second end 35 to the second opening 37.

The rigid areas 14 of the outer sheet 10 have hollow portions 46, in particular in the flats 15. At the hollow portions 46, the outer sheet 10 bears on the inner sheet 20, in particular on the flats 25. The hollow portions 46 are made to stabilize the space 30 of the element 1, in particular to prevent the space 30 from collapsing. In the embodiment of FIG. 1, the hollow portions 46 of the outer sheet 10 are respectively aligned, in the branches 40, 42, in the winding direction Y. Nevertheless, in other embodiments, the hollow portions 46 in the rigid areas 14 may be arranged randomly.

The assembly of the spiral exchanger is described below.

In a first step, the outer 10 and inner 20 sheets are stamped to form the flexible areas 12, 22 and the rigid areas 14, 24. Then, the outer and inner sheets are arranged such that the flexible areas 12, 22 and the rigid areas 14, 24 are respectively positioned across from one another (see FIGS. 3 and 4). The outer sheet 10 is placed relative to the inner sheet 20 such that the passage of the fluid is ensured, and the passage section 32 of the fluid is constant even after the winding.

Next, the outer 10 and inner 20 sheets are fastened to each other by a weld running alongside the weld line 39, 44 to seal the space 30 between the two sheets relative to the outside of that space and to form the U-shaped trajectory for a fluid passing through the space 30. The outer sheet 10 and the inner sheet 20 can be fastened to one another using a seam weld, laser weld, or, for example, brazing.

Figure 6:
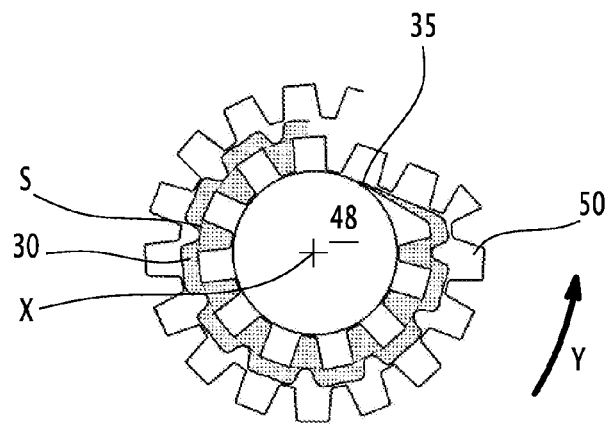
FIG. 6 is a cross-sectional view in the radial plane of a spiral exchanger according to the invention after a winding turn.

In a subsequent step, as shown in FIG. 6, the second end 35 of the element 1 is fastened to a central tube 48 to wind the element 1 from the second end 35. The outer sheet 10 is radially outside the inner sheet 20 during the winding. Once the element 1 is wound, the openings 36, 37 are turned outward. A passage 50 is formed between the outer sheet of a layer and the inner sheet of the successive layer of the wound element 1, through which the exhaust gas passes to transfer its heat to the fluid circulating in the space 30 of the element 1. In an embodiment, the central tube 48 is obstructed.

During the winding, the folding of the outer sheet 10 is done in the flexible areas 12, in particular in the rectilinear portion of the fastening plane S in the hollow profiles 17. The inner sheet 20 is folded at the edges 26. The folding axis will then be situated between the hollow profiles 17 of the outer sheet 10 and the adjacent edges 26 of the inner sheet 20 in the fastening plane S. In the outer sheet 10, the flexible areas 12 are a reserve of material to make it possible, during winding of the element 1, to elongate the outer sheet 10. In any case, the edges 26 of the inner sheet 20 and the hollow profiles 17 of the outer sheet 10 behave like a hinge during winding of the element 1. The respective deformations of the outer sheet 10 and the inner sheet 20 are therefore different from one another, to allow elongation of the outer sheet relative to the inner sheet during winding of the element 1. The number of winding layers varies and depends on the use of the exchanger. During winding, the passage section 32 does not change significantly.

Figure 7:
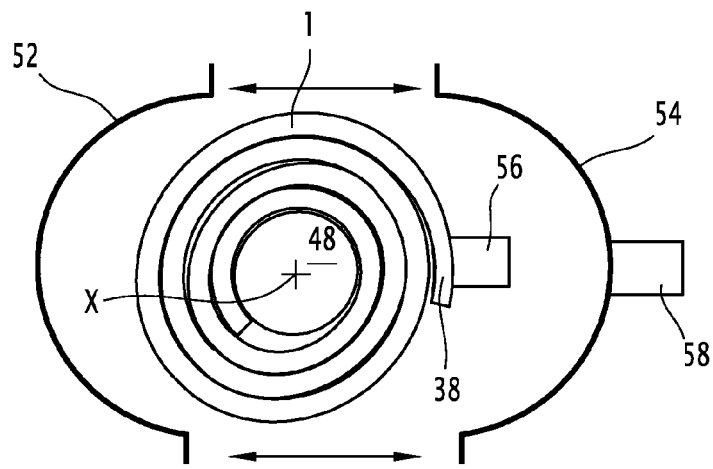
FIG. 7 is a cross-sectional view in a radial plane of the exchanger during mounting in an exhaust.

FIG. 7 shows the mounting of the exchanger in half-shells 52, 54 of an exhaust. Tubes 56 are fastened to the inlet opening 36 and the outlet opening 37 and are connected to tubes 58 of one of the half-shells 54 of the exhaust. Once assembled, the half-shells 52, 54 constitute a part of the exhaust system of a combustion engine. To that end, the assembly of the element 1 and the tube 48 is placed in half-shells 52, 54, and a fluid is injected through the tubes 56, 58 into the space 30 of the element 1.

In one embodiment, the distance between the openings 36, 37 may be reduced. For example, the openings may be positioned such that the exchanger is less sensitive to dimensional variations between the exchanger and the half-shells 52, 54. In fact, in an exchanger without fluid vaporization, the outer and inner sheets 10, 20 are at the temperature of the fluid while the half-shells 52, 54 are close to the temperature of the exhaust gas passing through the half-shells.

Figure 8:
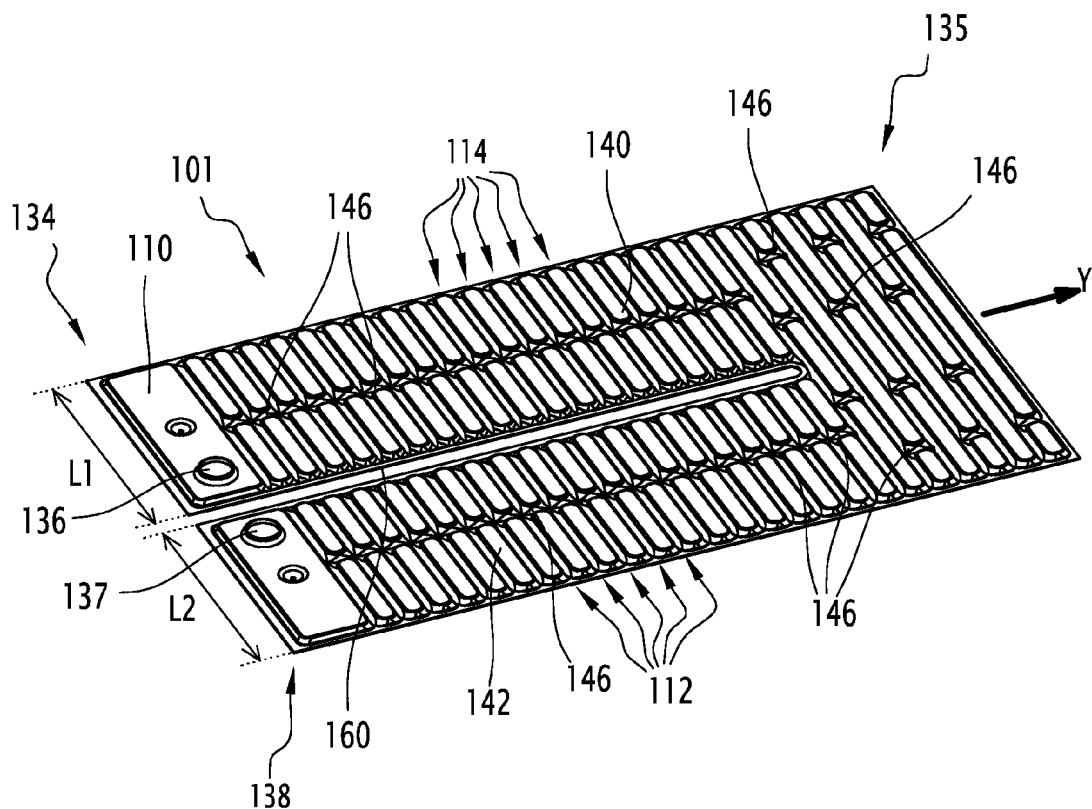
FIG. 8 is a schematic perspective view of an outer sheet metal sheet for a spiral exchanger according to a second embodiment.
Figure 9:
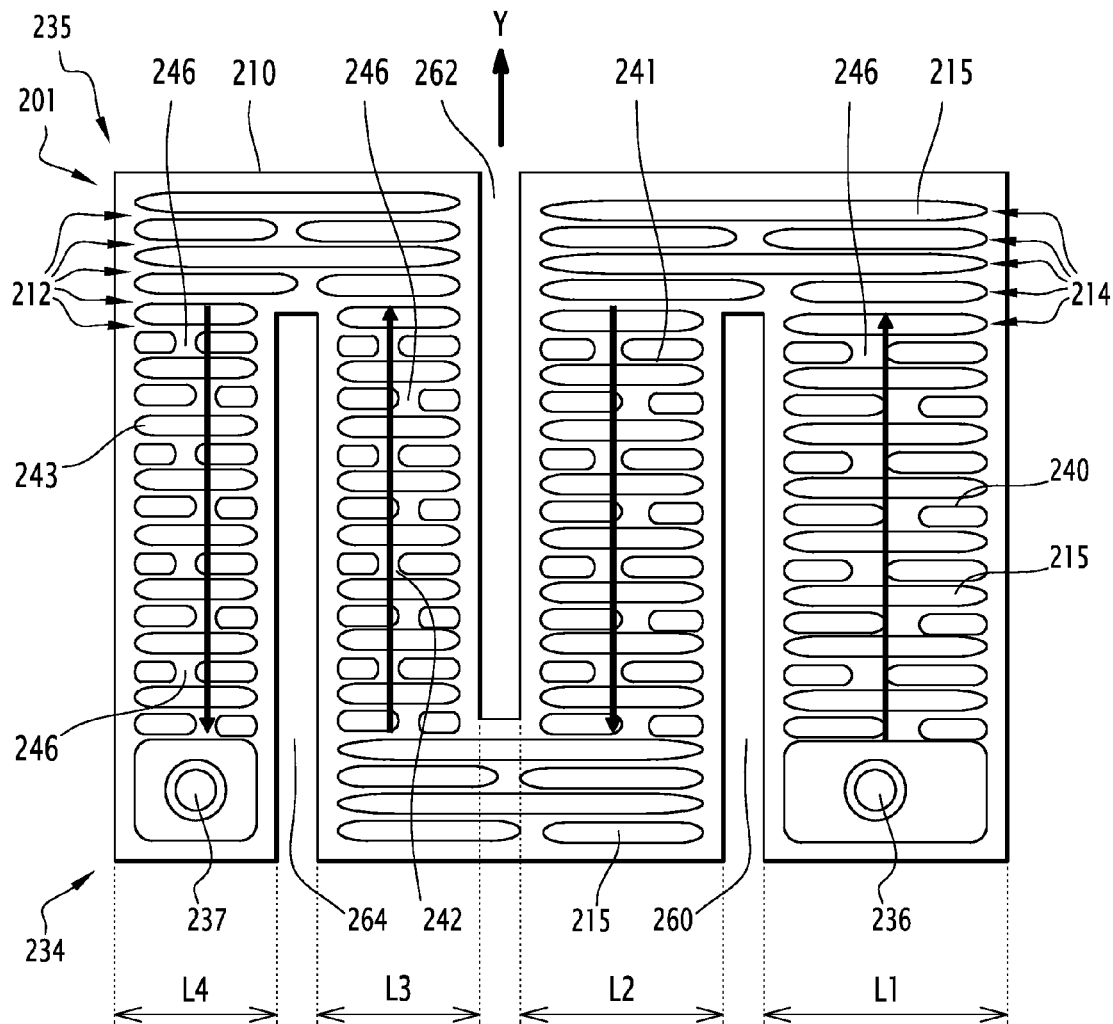
FIG. 9 is a top view of an outer sheet metal sheet of another embodiment for a spiral exchanger according to the invention.

In other embodiments, which are described relative to FIGS. 8 and 9, a fluid circulating in the exchanger is vaporized and overheated.

FIG. 8 schematically illustrates an element 101 of an exchanger provided to vaporize fluid. The elements of the embodiment of FIG. 8 that are identical or perform the same function as those of the embodiment of FIGS. 1 to 7 will be designated using the same references plus 100.

In the same way, it has flexible areas 112 and rigid areas 114 to allow winding with controlled deformations. The same principle as in the embodiment of FIGS. 1 to 7 is used. As in the embodiment FIGS. 1 to 7, a space to guide the fluid between the two sheets 110 is generally U-shaped with a first branch 140 and a second branch 142. Unlike FIG. 1, the first branch 140 and the second branch 142 are separated from one another by a longitudinal cut-out 160 in the winding direction Y. A width L1 of the first branch 140 bearing the inlet opening 136 is larger than the width L2 of the second branch 142 bearing the outlet opening 137. A passage section for the fluid in the space in the second branch 142 is then smaller than a passage section of the fluid in the space in the first branch 140. The width L2 of the second branch 142 is between 10% and 80% smaller, in particular between 20% and 60% smaller, than the width L1 of the first branch 140. In one embodiment, the width L2 of the second branch 142 is 33% smaller than the width L1 of the first branch 140 for a mass flow of 30 liters/hour.

In fact, during operation of the exchanger, the fluid enters in liquid form into the inlet opening 136, passes through the first branch 140, turns around at the second end 135, passes through the second branch 142, and leaves through the outlet opening 137 in gas form.

FIG. 9 illustrates another embodiment of an element 201 for a spiral exchanger. In particular, FIG. 9 shows an exchanger for vaporizing a fluid. FIG. 9 is a schematic top view of an outer sheet 210 of an element 201. The elements of the embodiment of FIG. 9 that are identical or perform the same function as those of the embodiment of FIGS. 1 to 7 will be designated using the same references plus 200.

The outer sheet 210 has flexible areas 212 and rigid areas 214 that are arranged alternatingly in the direction of winding Y.

The space between the inner and outer sheets 210 is formed such that the fluid is guided by a W-shaped trajectory (shown upside down in FIG. 9). The element 204 therefore has four branches 240, 241, 242 and 243. In other embodiments, the element has more than four branches. The branches 240, 241, 242 and 243 respectively extend in the winding direction Y and have, between two respective adjacent branches, cut-outs 260, 262, 264 to separate one of the branches from the other adjacent branches. The inner and outer sheets 210 are cut by the cut-outs 260, 262, 264. The first branch 240 is connected to the second branch 241 at the second end 235, the second branch 241 is connected to the third branch 242 at the first end 234, and the third branch 242 is connected to the fourth and final branch 243 at the second end 235.

The element 201 has an inlet opening 236 and an outlet opening 237. The inlet opening 236 is arranged at the first end 234 of the first branch 240. The outlet opening 237 is arranged in a fourth branch 243 at the first end 234. In fact, during operation of the exchanger, the fluid enters in liquid form into the inlet opening 236 and exits through the outlet opening 337 in gas form.

The branches have, in the direction of the winding axis, a width L1, L2, L3, L4, the width of the branches 240, 241, 242, 243 decreasing gradually in that order. For example, the width L2 of the second branch 241 is decreased by 33% relative to the width L1 of the first branch 240. The widths L3, L4 of the third branch 242 and the fourth branch 243, respectively, are approximately half the width L1 of the first branch 240. In an embodiment, the first branch 240 has a width L1 of approximately 50 mm.

Contrary to the embodiment presented relative to FIGS. 1 to 8, the hollow portions 246 and the rigid areas 214 of the branches 240, 241, 242, 243, where the rigid area 214 of the outer sheet 210 bears against the rigid area of the inner sheet, are not aligned in the winding direction Y to create more perturbations of the fluid.

During operation of the exchangers for the vaporization of FIGS. 8 and 9, the fluid is introduced into the element 101, 201 of the exchanger at a temperature of from 80° C. to 100° C. and vaporizes, while absorbing the heat given off by the exhaust gases. The evaporation takes considerable energy from the exhaust gases, and the temperatures of the outer and inner sheets in that area are therefore the same as that of the fluid. Next, the vapor from the fluid will behave like a gas as it overheats. The final temperature of the overheated vapor is approximately 200° C. to 500° C. or more depending on the pressure. Near the outlet 237 of the vapor, the temperature of the sheets of the exchanger is comprised between the vapor and that of the exhaust gas. The exchanger thus has a high temperature gradient between the fluid inlet in the exchanger (90° C. to 100° C.) and the fluid outlet (400 to 650° C.). For that reason, the cut-outs 60, 260, 262, 264 are formed in the elements 101, 201, as the heat expansion of each branch is different.

In gaseous form, the fluid for example has a volume 1,680 times larger than that in liquid form, which means that at an equal mass flow, the volume flow rate is much higher, and therefore its speed is higher. The final speed of the vapor is a very important parameter in correctly vaporizing and overheating the vapor. In fact, the greater the speed, the more the heat exchanges at the wall of the space between the two sheets are good. That is why the passage section offered to the steam is reduced. In the embodiments of FIGS. 8 and 9, this reduction is proportional to the width of the branches. This makes it possible to increase the speed, and therefore further increase the heat exchanges.

For example, in the element of FIG. 9, the first branch 240 has a first area that corresponds to an area in which the fluid is heated until the first microbubbles appear (beginning of vaporization). Next, the vaporization will effectively take place in the second branch 241. The movement of the fluid is accelerated in the second branch 241 by narrowing the passage section to favor vaporization. In the third branch 242 and the fourth branch 243, the vapor is transformed from a wet or saturated vapor to an overheated vapor. There again, decreasing the passage section makes it possible to increase the speed of the vapor, and thus the turbulence and therefore the heat exchange.

The fluid circulating in the exchanger according to the invention is water or another liquid. In one embodiment, the liquid is an organic fluid, for example ethanol.

Generally, the exchanger according to the invention allows great flexibility. In some embodiments, the passage section of the fluid is managed over the course of the latter's conversion into overheated vapor. In other embodiments, the passage sections are varied depending on the anticipated temperatures of the exhaust gas. According to one embodiment, the length of the sheet metal sheets in the winding direction is varied as a function of the desired vapor quality and available energy in the exhaust gas.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A spiral exchanger having a winding axis comprising:
an outer sheet and an inner sheet secured to one another in a fastening plane before winding and delimiting a space for a fluid between them, the outer sheet and the inner sheet being wound on themselves and each outer and inner sheet including a plurality of flexible areas and a plurality of rigid areas, the flexible areas being more flexible than the rigid areas during folding;
the flexible areas and the rigid areas are extended along the winding axis, and at least one flexible area of the outer sheet and at least one flexible area of the inner sheet that delimit the space between them form a pair of flexible areas that are aligned in a same radial direction, wherein
when considered in cross-section in a direction of winding, the rigid areas are formed by flats and the flexible areas are formed by hollow profiles and edges are arranged between the hollow profiles and the flats, and wherein the hollow profiles of the outer sheet are, in a winding direction, defined by a first dimension, and wherein the hollow profiles of the inner sheet are, in the winding direction, defined by a second dimension that is greater than the first dimension, and wherein the hollow profiles are formed toward the winding axis; and wherein flats on the outer sheet have a first flat dimension in the winding direction that is greater than a second flat dimension of flats on the inner sheet, the flats of the inner and outer sheets being aligned with each other such that a minimum fluid passage section is defined by a space between the hollow profiles of the outer sheet and edges of the inner sheet.

2. The exchanger according to claim 1, wherein the flexible areas of at least one of the sheets selected from the outer sheet and the inner sheet are rectilinear in a direction of the winding axis.

3. The exchanger according to claim 1, wherein a majority of the flexible areas of the outer sheet form, with a respective flexible area of the inner sheet, a pair of flexible areas that are aligned in a same radial direction.

4. The exchanger according to claim 1, wherein each flexible area, in particular each hollow profile of the outer sheet has, over an entire width of the outer sheet in the direction of the winding axis, a rectilinear part that is located at the fastening plane, and wherein each flexible area, in particular each edge of the inner sheet, has, over its entire length parallel to the winding axis, at least one rectilinear portion that is located in the fastening plane to form a plurality of hinges in the fastening plane.

5. The exchanger according to claim 1, wherein a plurality of flats of the outer sheet is provided with at least one hollow portion, the hollow portions bearing against an opposite flat of the inner sheet.

6. The exchanger according to claim 1, including at least one fluid inlet opening to introduce fluid into the space and at least one fluid outlet opening to remove fluid from the space, the at least one inlet opening and the at least one outlet opening being arranged at a first end of one of the outer sheet or the inner sheet in the winding direction, the first end being opposite a second end at which the winding began.

7. The exchanger according to claim 1, wherein the space is U-shaped, W-shaped, or zigzagged, having rectilinear branches.

8. The exchanger according to claim 7, wherein the outer sheet and the inner sheet are fastened to one another respectively between two branches.

9. The exchanger according to claim 8, wherein the outer sheet and the inner sheet have a respective cut-out between two branches.

10. The exchanger according to claim 6, wherein an average passage diameter in the space decreases between the at least one fluid inlet opening and the at least one fluid outlet opening.

11. The exchanger according to claim 7, wherein each branch has a substantially constant width and the width of the branches in the direction of the winding axis of the at least two branches decreases one relative to the other.

12. The exchanger according to claim 1, wherein at least one of the sheets selected from the outer sheet and the inner sheet is made up of a metal sheet.

13. A portion of an exhaust comprising:
a spiral exchanger having a winding axis including an outer sheet and an inner sheet secured to one another in a fastening plane before winding and delimiting a space for a fluid between them, the outer sheet and the inner sheet being wound on themselves and each including a plurality of flexible areas and a plurality of rigid areas, the flexible areas being more flexible than the rigid areas during folding;

the flexible areas and the rigid areas are extended along the winding axis, and at least one flexible area of the outer sheet and at least one flexible area of the inner sheet that delimit the space between them form a pair of flexible areas that are aligned in a same radial direction, wherein when considered in cross-section in a direction of winding, the rigid areas are formed by flats and the flexible areas are formed by hollow profiles and edges are arranged between the hollow profiles and the flats, and wherein the hollow profiles of the outer sheet are, in a winding direction, defined by a first dimension, and wherein the hollow profiles of the inner sheet are, in the winding direction, defined by a second dimension that is greater than the first dimension, and wherein the hollow profiles are formed toward the winding axis; and wherein flats on the outer sheet have a first flat dimension in the winding direction that is greater than a second flat dimension of flats on the inner sheet, the flats of the inner and outer sheets being aligned with each other such that a minimum fluid passage section is defined by a space between the hollow profiles of the outer sheet and edges of the inner sheet.

14. The exchanger according to claim 1, wherein the hollow profiles of the outer sheet have, in a winding direction, a smaller width relative to a width of the flats of the outer sheet.

15. The exchanger according to claim 14, wherein the width of the flats of the outer sheet is approximately twice the width of the hollow profiles of the outer sheet.

16. The exchanger according to claim 14, wherein the hollow profiles of the inner sheet have, in the winding direction, a width larger than a width of the flats of the inner sheet.

17. The exchanger according to claim 16, wherein the width of the hollow profiles of the inner sheet is approximately twice the width of the flats of the inner sheet.

18. The exchanger according to claim 16, wherein the width of the flats of the inner sheet corresponds to the width of the hollow profiles of the outer sheet, and the width of the flats of the outer sheet corresponds to the width of the hollow profiles of the inner sheet.

19. The portion of the exhaust according to claim 13, wherein the hollow profiles of the outer sheet have, in the winding direction, a smaller width relative to a width of the flats of the outer sheet.

20. The portion of the exhaust according to claim 19, wherein the hollow profiles of the inner sheet have, in the winding direction, a width larger than a width of the flats of the inner sheet.

21. The portion of the exhaust according to claim 20, wherein the width of the flats of the inner sheet corresponds to the width of the hollow profiles of the outer sheet, and the width of the flats of the outer sheet corresponds to the width of the hollow profiles of the inner sheet.

22. The exchanger according to claim 1, wherein the inner sheet has a greater thickness than the outer sheet.

23. The portion of the exhaust according to claim 13, wherein the inner sheet has a greater thickness than the outer sheet.

* * * * *